United States Statutory Invention Registration [19]

[11] Reg. Number: H239

Franklin et al.

[43] Published: Mar. 3, 1987

[54] HYDRONIC HEATING SYSTEM

[75] Inventors: Kenneth Franklin, Gahanna, Ohio; John W. Hipple, Holliston, Mass.

[73] Assignee: The Dow Chemical Company, Midland, Mich.

[21] Appl. No.: 837,235

[22] Filed: Mar. 3, 1986

[51] Int. Cl.[4] ..... F24D 19/02; A01G 9/00

[52] U.S. Cl. ..... 165/47; 165/56; 47/17; 47/18; 237/69

[58] Field of Search ..... 47/18, 17; 165/56, 49, 165/47; 237/69

[56] References Cited

U.S. PATENT DOCUMENTS

| | | | |
|---|---|---|---|
| 2,066,656 | 1/1937 | Stromberg | 165/56 |
| 4,309,843 | 1/1982 | Kato | 47/18 |
| 4,338,994 | 7/1982 | Hewing et al. | 165/49 |
| 4,508,162 | 4/1985 | Radtke | 165/56 |
| 4,577,435 | 3/1986 | Springer et al. | 47/2 |
| 4,588,125 | 5/1986 | Lutz | 237/69 |

FOREIGN PATENT DOCUMENTS

| | | | |
|---|---|---|---|
| 0133631 | 3/1985 | European Pat. Off. | 165/56 |
| 2840686 | 4/1980 | Fed. Rep. of Germany | 165/49 |
| 2850669 | 5/1979 | Fed. Rep. of Germany | 165/49 |
| 2911579 | 10/1980 | Fed. Rep. of Germany | 165/49 |
| 8501056 | 7/1985 | Netherlands | 47/18 |
| 2095814 | 10/1982 | United Kingdom | 165/56 |

*Primary Examiner*—Harold J. Tudor
*Attorney, Agent, or Firm*—Michael L. Winkelman; Bruce M. Kanuch; Richard G. Waterman

[57] ABSTRACT

A hydronic heating system that includes a tube or series of tubes placed on modular composite panels. The panels are fabricated with a grooved surface to permit the flush embedment of the tubes on the panels.

9 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDRONIC HEATING SYSTEM

BACKGROUND OF THE INVENTION

This invention pertains to hydronic systems and particularly to hydronic systems useful for horticulture.

Temperature regulating devices in the form of a hydronic system have various uses. See, for example, U.S. Pat. Nos. 2,762,896; 3,106,801 and 4,338,994. Numerous hydronic systems useful for horticulture applications are disclosed in U.S. Pat. Nos. 1,983,862; 3,316,673; 4,212,348 and 4,309,843.

Hydronic systems useful in regulating soil temperatures by circulating fluids in pipes under growing plants have heretofore balanced two conflicting objectives: energy efficiency and protection of the hydronic pipes. For instance, many hydronic systems employ temperature regulating panels constructed with tunnels therein. This design protects the pipes from physical damage, but is not energy efficient. Positioning the pipe nearer to the plant root zone, the critical growing area, will obviously minimize the amount of energy required. Thus, many hydronic systems are constructed with expensive holder devices attached to the surface of the panel. These tend to hold the pipe in closer proximity to the root microclimate; however, without an additional surface coating around the base and sides of the pipe, the pipe is exposed to physical damage by cultivating devices and foot traffic. Such surface coatings effectively eliminate the modularity of the panels.

In view of the deficiencies of the prior art, it would be highly desirable to provide a modular hydronic system that positions a releasably disposed pipe very close to the target area, i.e., the plant root zone, to provide a flat surface while protecting the pipe from physical damage.

SUMMARY OF THE INVENTION

The present invention is a hydronic system capable of use in horticulture that comprises (a) a means for circulating fluid comprising at least one pipe; and (b) a modular composite panel comprising (1) a first layer having a first major planar surface and a second major planar surface, and (2) a second layer having a first surface adhered to the first major planar surface of the first layer, and a second major surface having a topography defining one or more grooves with a depth relatively equal to the external diameter of the pipe, so that the second major surface of the second layer with the pipe laid thereon is relatively flat.

Accordingly, the panels of this hydronic system provide an inexpensive pipe holder that protects the pipes from physical damage. That is, the holder device is designed to protect the pipe without an additional protective layer, which reduces modularity. Further, the panels of this invention advantageously position the hydronic pipes to create a plant root microclimate.

BRIEF DESCRIPTION OF THE DRAWINGS

In the drawings and accompanying detailed description, preferred embodiments of the present invention are shown and described, but it is to be understood that the drawing and accompanying description are for the purpose of illustration only and do not limit the invention and that the invention will be defined in the appended claims.

DETAILED DESCRIPTION OF THE INVENTION

By "hydronic" it is meant that the system pertains to heating or cooling through the transfer of heat by a circulating fluid in a closed system. "Fluid" means a vapor or a liquid. Advantageously when liquid, the fluid must be able to absorb and emit temperature relatively rapidly; a preferred fluid is water.

The closed system may be any tube or plurality of interconnecting tubes capable of conducting liquid. The tube may be constructed from any noninsulating material. The tube has an inner diameter and an outer diameter, the relative dimensions of which will vary depending on, among other things, the type of fluid circulated and the material from which the tube is fabricated. Preferably, the closed system consists of a single tube flexible enough to permit installation in a series of loops. An example of tubing particularly well-suited for the objectives of this invention is 5/16 inch EPDM (ethylene-propylene diene monomer), an elastomer based on stereospecific linear terpolymers of ethylene, propylene and small amounts of a non-conjugated diene.

The fluid is circulated through the tube by pumping means. In one embodiment for cold weather climates, a pump may be used to move fluid, warmed by geothermal or waste processing heat, through a circuit of tubes. In a preferred embodiment for cold weather climates, the pumping means comprises a boiler to introduce warm fluid through a supply heater and to accept, through a return heater, cooler fluid to be reheated. In a preferred embodiment for warm weather climates, a refrigeration unit and pump are substituted for the boiler, and cold fluid is circulated to regulate the plant microclimate.

The system further comprises the hydronic tubes positioned on modular composite panels with the tubes placed on the panel, providing a flat, temperature-regulating surface on which to grow plants.

By "modular"is meant that the panel may be used with other panels to create a variety of easily rearranged configurations. The panels may be directly abutted, or interlocked with an attachment means. For example, suitable attachment means would include a recess on one panel and a projection in another panel, such as a dovetail joints as shown in FIG. 5. In another embodiment, two panels may be connected by a tongue and groove joint.

Figure 1:
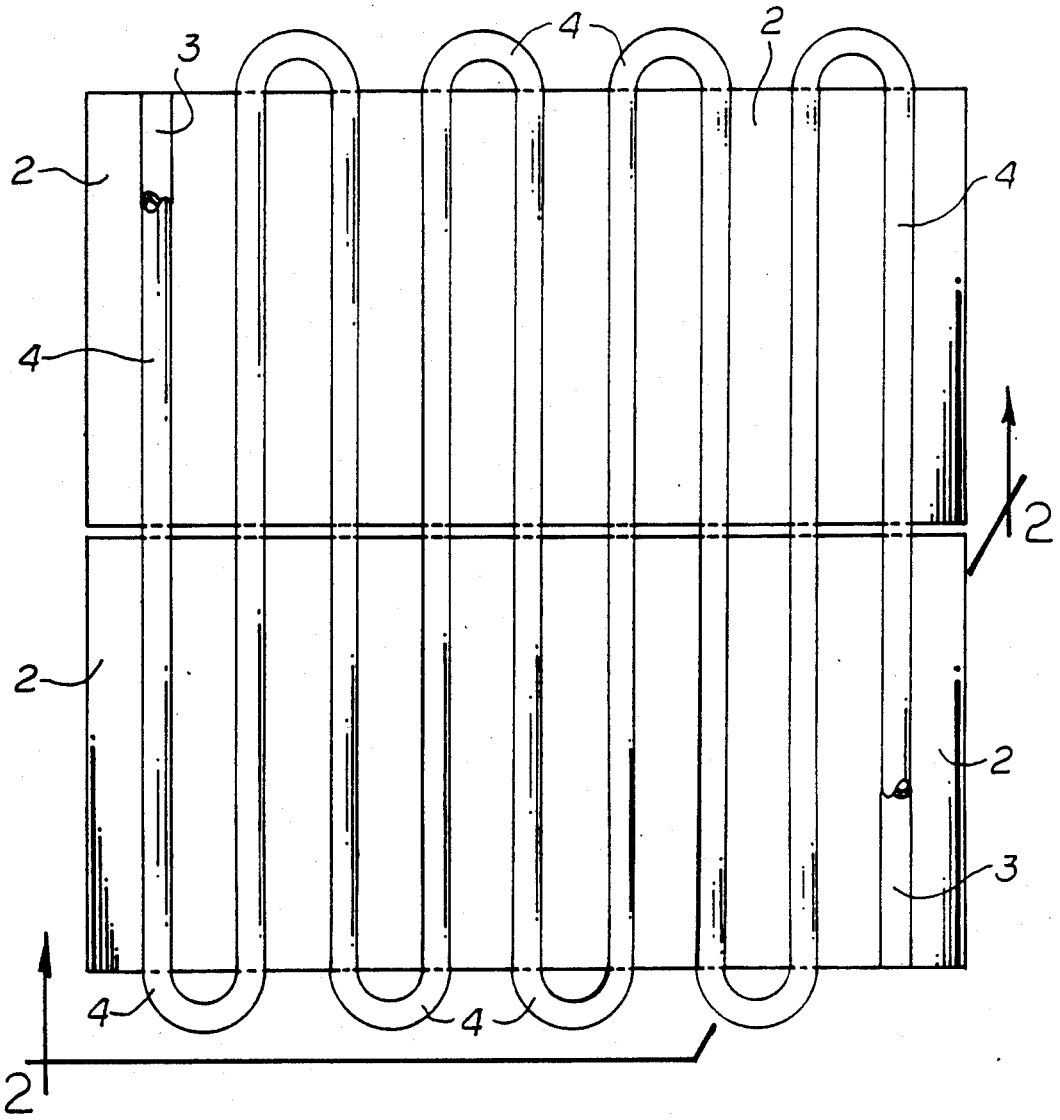
FIG. 1 is a plan view of two modular panels, A and B, positioned side-by-side, with a hydronic pipe placed in a serpentine configuration thereon.

The temperature regulating panels, as seen in FIG. 1, may be rectangular; however, the panel may be of any convenient shape, provided the sides are complimentary to other temperature regulating panels. Further, an individual panel may be of any convenient dimension, for example, 2 ft.×8 ft. Referring to FIG. 1, a releasably disposed tube 4, is placed on aligned panels, A and B, to form a serpentine pattern over substantially the whole of the temperature regulating panels.

Figure 2:
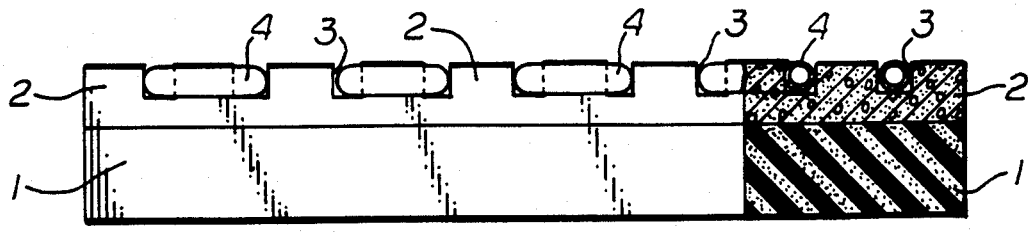
FIG. 2 is a partially broken away end view of Panel B in FIG. 1.
Figure 3:
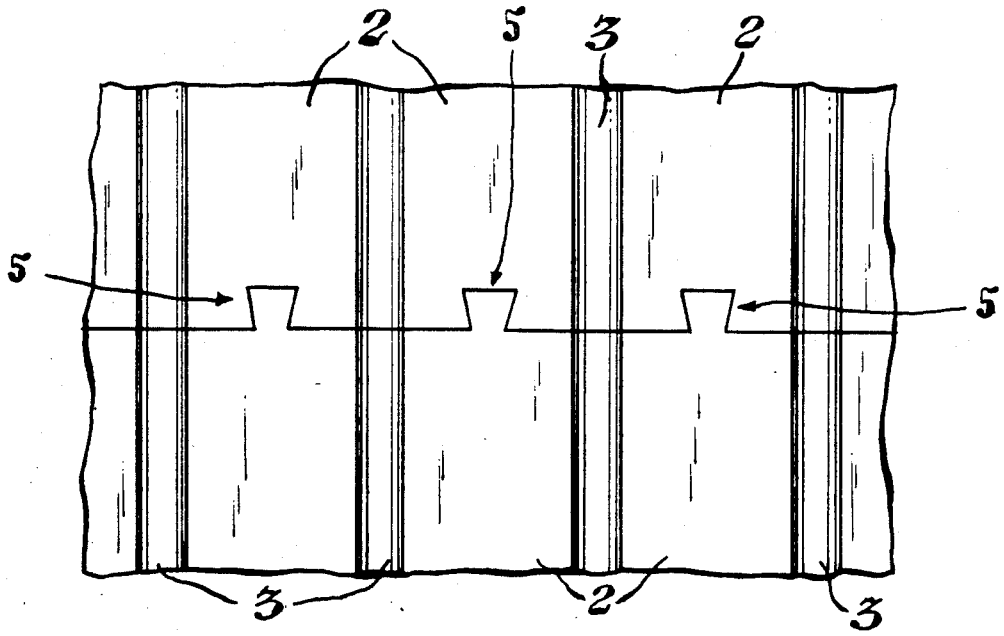

By "composite" is meant that the panel comprises at least two layers. As seen in FIG. 2, the composite panel, in one embodiment, has a first layer 1 having a first major planar surface and a second major planar surface; and a second layer 2 having a first major planar surface adhered to the first major planar surface of the first layer and a second major surface having a topography defining one or more grooves 3 with a depth relatively equal to the external diameter of the pipe 4 so that the second major surface of the second layer with the pipe laid thereon is relatively flat.

The first layer may be constructed of any temperature-insulating material. Preferably, the layer is fabricated from expanded, closed-cell polystyrene foam. The thickness of the first layer is dependent upon a number of conditions that will be evident to the skilled artisan, such as the environmental conditions of the greenhouse and the growing requirements of the specific plants. In general, the first layer may be about ½ inch to about 4 inches thick. The first layer is preferably about one inch thick, most preferably about two inches thick.

The grooved second layer serves two functions: as an insulating layer and as protection for the first layer. It may be constructed of any impact-resistant material. A preferred material is latex-modified concrete; in addition to being a hard material, the mortar also acts as an energy mass to store energy for subsequent release.

In general, the material must be of sufficient thickness to withstand the weight of persons standing and walking on the panel, while they inspect or cultivate the plants. In general, the thickness of the second layer may be about ¼ to about 4 inches. Preferably, the thickness of the second layer is at least about ⅛ inches greater than the depth of the grooves. For example, if the depth of the grooves is about ⅜ inch, then the total thickness of the second layer about ½ inch. Stated differently, the thickness of the second layer between the second major surface of the second layer and the deepest part of groove is at least about ⅛ inch.

In FIG. 2, the tubes are laid on a temperature-regulating panel having at least one recessed surface area, said recessed area forming at least one groove 3. The grooves may run over any direction of the panel. Preferably, the grooves run in a straight line over the full length or width of the panel. Most preferably, the surface defines a plurality of equally spaced parallel grooves—for example, about 2 inches on center.

A transverse cross-sectional view of the grooves may define any shape that will permit positioning of the tube. Preferably, the transverse cross-section of the grooves may define three sides of a square as seen in FIG. 2. Most preferably, the transverse cross-section of the grooves may be shaped to define a partial circumference of a circle. Further, the closer the recessed panel walls are to the tube, the less effect convective forces can have on the hydronic system. Thus, the groove advantageously has a width relatively equal to, but not less than the external diameter of the pipe. For example, when 5/16 inch tubing is employed, 5/16 inch wide by 5/16 inch deep channels are optimum.

The following example is presented to further illustrate, but not limit, the scope of this invention.

Example

A greenhouse is outfitted with metal rolling benches having dimensions ranging from 28–62 inches (in.) by 72 feet (ft.). Shade curtains are installed in the greenhouse, as well as recirculation fans approximately 3 ft. above every other bench.

For the purposes of this experiment, the bench tops are boards 2 ft. wide by 8 ft. long. Each board has a mortar facing on 2 in. thick Styrofoam® brand plastic foam insulation. The mortar facing has 5/16 in. wide by 5/16 inch deep channels spaced 2 in. on center and parallel to the length direction of the board. The bench top supports are nominal 1 in. by 1 in. steel tubing spaced 24 in. on center.

Five-sixteenth in. EPDM tubing is installed by embedding it into the channels of the mortar-faced bench tops.

A control valve on each bench is instrumented with a separate clock to measure the amount of time the system is actually supplying heat to each particular bench, and a separate event counter in order to measure the number of on cycles for each bench.

Thermocouples (7 each) are installed on and around the individual benches per the following schedule:

(1) about 4.5 ft. above the plants;
(2) about 6 in. above the tallest plant;
(3) in the soil;
(4) attached to outer surface of the 5/16 in. EPDM tubing;
(5) attached to the bottom surface of the bench top;
(6) about 6 in. below the bottom of the bench top;
(7) at the control valve (event marker).

This arrangement allows determination of the microclimate around each bench over a period of time. A (multi-point) recorder is used to record thermocouple readings.

Test No. 1

The test bench is loaded with 4 rows of cuttings and plugs. The bench is approximately one-eighth full, with the plants placed on the end opposite the supply and return headers. Soil temperature thermostats are set to 72 degrees Farenheit (°F.) and the back-up furnace thermostat to 65° F. for 7 days. [168 hours (hrs.)].

| Total Hrs. That The Hydronic System Is On | No. Of Cycles Per Bench |
|---|---|
| 53.5 | 54 |

Test No. 2

The test bench is loaded with 4 rows each of 6 potted Poinsettias, placed on the end opposite the supply and return headers. Soil temperature thermostats are set to 72° F. and the back-up furnace to 65° F. for 7 days (168 hrs).

| Total Hrs. That The Hydronic System Is On | No. Of Cycles Per Bench |
|---|---|
| 27.5 | 32 |

Test No. 3

During this test, the test bench is loaded to about 90 percent capacity with assorted cuttings. The soil temperature thermostat is set to 65° F. for 8 days (192 hrs).

| Total Hrs. That The Hydronic System Is On | No. Of Cycles Per Bench |
|---|---|
| 69.0 | 51 |

What is claimed is:

1. A hydronic system capable of use in horticulture that comprises:

(a) a means for circulating fluid comprising at least one pipe; and (b) a modular composite panel comprising:

(1) a first layer having a first major planar surface and a second major planar surface;

(2) a second layer having a first major planar surface adhered to the first major planar surface of the first layer and a second major surface having a topography defining one or more grooves with a depth relatively equal to the external diameter of the pipe so that the second major surface of the second layer having the pipe laid thereon is relatively flat.

2. A hydronic system of claim 1, wherein the first layer is fabricated from expanded, cellular polystyrene.

3. A hydronic system of claim 1, wherein the first layer is at least about ½ inch thick.

4. A hydronic system of claim 1, wherein the second layer is fabricated from a latex-modified concrete.

5. A hydronic system of claim 1, wherein the total thickness of the second layer is at least about ⅛ inch greater than the depth of the grooves.

6. A hydronic system of claim 5, wherein the second layer is at least about ¼ inch thick.

7. A hydronic system of claim 1, wherein the contoured surface of the second layer defines a plurality of parallel grooves, said contoured surface having at least one pipe positioned in serpentine position thereon.

8. A hydronic system of claim 1, wherein the groove has a width relatively equal to, but not less than, the external diameter of the pipe.

9. A hydronic system of claim 1, wherein the composite panel comprises a means of attachment with similar panels.

* * * * *